April 5, 1960

G. DIRKS 2,931,572

DECIMAL ADDER-SUBTRACTOR DEVICE UTILIZING MAGNETIC RECORDINGS

Filed March 30, 1955

Inventor:
Gerhard Dirks
by Michael S. Striker
Attorney

United States Patent Office 2,931,572
Patented Apr. 5, 1960

2,931,572

DECIMAL ADDER-SUBTRACTOR DEVICE UTILIZING MAGNETIC RECORDINGS

Gerhard Dirks, Frankfurt am Main, Germany

Application March 30, 1955, Serial No. 498,060

Claims priority, application Germany October 1, 1948

5 Claims. (Cl. 235—176)

The invention relates to automatic calculators, which are controllable by means of electrical signals.

This application is a continuation-in-part of patent application Ser. No. 101,032, filed June 24, 1949.

Calculators, as hitherto known, may be classified as mechanical, electro-mechanical and electronic calculators. The electro-mechanical and electronic calculators are very superior to those working on a mechanical principle, both in efficiency and adaptability but, according to the state of technology prevailing up to now, they require an extraordinarily large number of relays, electronic tubes, switching means and wiring. Moreover, these machines are heavy, bulky and very expensive.

In order to replace mechanical and electro-mechanical calculators by the more efficient electronic computing means, one has applied either electrical measuring processes with limited accuracies, or digit computing processes.

It is characteristic of the known mechanical or electro-mechanical calculating processes, that the computing means for each denomination of a number to be processed are provided with means for the following computing functions. These computing functions are:

(1) Recording or storing the result (for example by a definite positioning of a counter wheel in each denomination), (2) Adding or subtracting within each denomination (for example, by means of a rotation of the wheels corresponding to digit values), (3) Separating between a digit value remaining in the same denomination, and a value to be carried over to the next denomination, (4) Forwarding the carry-over to the next denomination.

The lines of development which have been followed hitherto in electronic digital calculators likewise require for each denomination means which are able to carry out the said four processes.

This requirement entails basic difficulties, as the conditions to be met for the process (1) of storing are radically different from those met for the computing processes (2)-(4). The means for carrying out both types of process differ in principle and can be combined only with difficulty.

Electronic calculators combining all said processes within the same means are therefore unnecessarily delicate and expensive.

Such a combination has the disadvantage that for every denomination calculating means must be installed whose calculation potential is used only for a fraction of the time while they are mainly needed as storing means.

It has been proposed to have separate means for the storage and computing processes. For example storing by means of electro-magnetic relays and by flip-flop circuits has been proposed but for the large storage capacities required this involves a large and expensive plant for the storing process. It has also been proposed to make use of mercury delay lines for the storing process but this necessitates very delicate apparatus and a close supervision as to temperature and to the re-amplification.

As modern book-keeping machines and like office machinery require a large storing capacity with quick access to any part of the storage means, all the said proposals have been quite unsuccessful for such machines. If therefore these tasks of storage and computing are to be solved with known electronic calculators, extremely large plants are needed often requiring several rooms in a building, and because of their volume and their complexity they have been used for purely mathematical purposes only.

With electronic calculators working on the binary principle, each problem to be calculated must be expressed in terms of the numerical values 0 and 1 only. They require a previous transformation of the initial normal numbers into binary numbers as well as, vice versa, a return transformation of the final binary numbers into normal numbers.

As the calculation with binary numbers is only adaptable if the transformation from normal numbers to binary numbers does not require more time and other requirements than the mere calculation process demands, such calculators are only suitable for the solution of mathematical problems and especially only when a number transformed into the binary system or derivations of such a number may be repeatedly employed. Therefore computers based on the binary principle are not applicable for the ordinary commercial office machines for book-keeping and the like, but only for very expensive large capacity punched card machinery.

The great size of the known electronic calculators or rather calculating plants restricts them to use in a definite location prepared for them, and the servicing of them is extremely expensive.

The electronic calculator according to this invention is, on the other hand, very reliable, simple, relatively small, handy and relatively cheap. It is suitable as a unit which can be used in combination with the usual office machines, such as typewriters, book-keeping machines of all kinds and sizes, and also for special machines, such as machines for statistical and organizing purposes. It is further more suitable for all desired combinations of such machines or for parts of such machines and may be built in the most simple manner either as an independent unit or in conjunction with other machines, or combinations of machines.

The calculators according to this invention are, moreover, considerably superior to all hitherto known, electronic calculators since, due to their relatively small size and simple and sturdy construction they can be built as portable units and carried on a journey in comparatively small receptacles (trunks, etc.).

By building standardized types the manufacture, storage, sale, use and servicing of the improved machines may be further simplified and cheapened.

The new principle according to this invention is to have a separate means for each of the four functions, and each operating for all the denominations.

The process subsequently described requires only a single computing means including a single digit value processing means and a single carry-over means for the computing functions (2)-(4) in all denominations.

The process requires also only one computing record means for the recording process (1) for all denominations. In operation it takes one digit value from the record means, processes it arithmetically with another digit value (for example, adds, subtracts, etc.) in the single computing means common for all denominations, removes the first-named digit value from the record means and records the new resulting digit value in the record means. This separation of functions may lead to complete separation of the functions (1)–(4) described above.

As the requirement of simultaneous recording and computing by the same means can be dispensed with, a simple record means can be used which is capable of recording a very large number of digit values. It therefore also facilitates in the simplest manner the production of calculators with large capacity.

Furthermore, very steady and reliable circuit arrangements can be provided for the three remaining computing functions (2)–(4), which could not be used otherwise, since they are not required for function (1).

The present invention provides an electric calculator comprising input means and output means and, for one or more computers, a magnetizable record means for digit value signals and an electrically-operating computing arrangement, wherein signals are transferred from the record means to the computing arrangement during the computing process of the different denominations of a number to effect result signals under the control of other digit values delivered to the computing ararngement, the result signals being transferred to the same or other record means.

The signals are represented in the record means by changes of the magnetic state of the record material of such means.

Usually the said digit values are transferred to the computing arrangement from the record means during the computation of the different denominations of a number. The digit values may be recorded successively, transferred and processed successively, effecting successive result signals. Resulting signals may be returned to appropriate localities on the same record means from which one of the operands was received or at a record means synchronized wherewith.

The invention is illustrated diagrammatically in the accompanying drawings, wherein.

Figure 1:
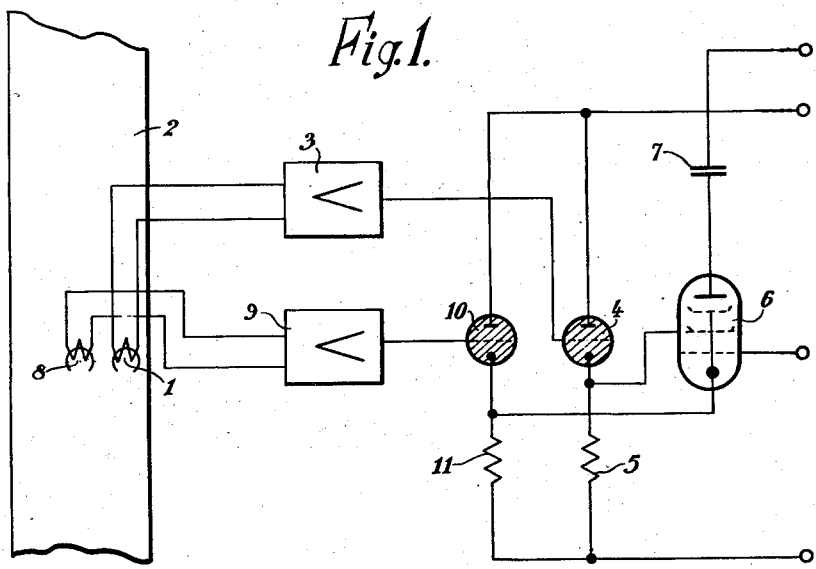
Fig. 1 shows a switching diagram for the control of the effectiveness of an electronic tube controlling a computing means.

Fig. 1 shows the principle of computing by using a capacitor as a computing element. The signal head 1 senses digit value signals recorded on the magnetizable tape or other magnetizable surface 2. After being amplified by amplifier 3 such a signal ignites the discharge tube 4 and, by means of the voltage drop across the resistor 5 allows conduction in pentode 6 whereby capacitor 7 is charged.

The limit value terminating signal sensed by sensing head 8 is amplified by amplifier 9 and ignites the gas discharge tube 10. The voltage drop across the resistance 11 biases the pentode 6 and renders it non-conducting, thus terminating the charging of condenser 7. The voltage to which said condenser is charged, is thus proportional to the time difference between the sensing of the respective signals.

In a similar manner a second digit value signal will effect the charging of the condenser and a second limiting value signal will terminate it, thus introducing a second digit value. The voltage of the capacitor is now proportional to the sum of the two digit values introduced by their digit value signals.

The charging of the capacitor need not be effected by one single switching process in allowing conduction in the pentode, but the capacitor can be charged by a plurality of separate operations of the pentode. It is only necessary that relatively small time-intervals occur between each operation of the pentode, so that the capacitor will not be discharged to any appreciable extent by leakage currents. If for instance a pentode is rendered conductive during the first switching operation for four time period units to represent the digit value "4," and in the second switching operation for five time period units to represent the digit value "5," the capacitor receives a voltage, which is equal to nine timing value units, namely representative of the sum of the digit values. If during the first switching operation the conduction of the pentode has lasted for 9 time period units to represent the digit value "9," and in the second switching operation 5 timing units to represent the digit value "5," the capacitor receives in this case a voltage corresponding to the digit value "14." Thus the capacitor 7 and the associated charging circuit act as a counter.

Figure 2:
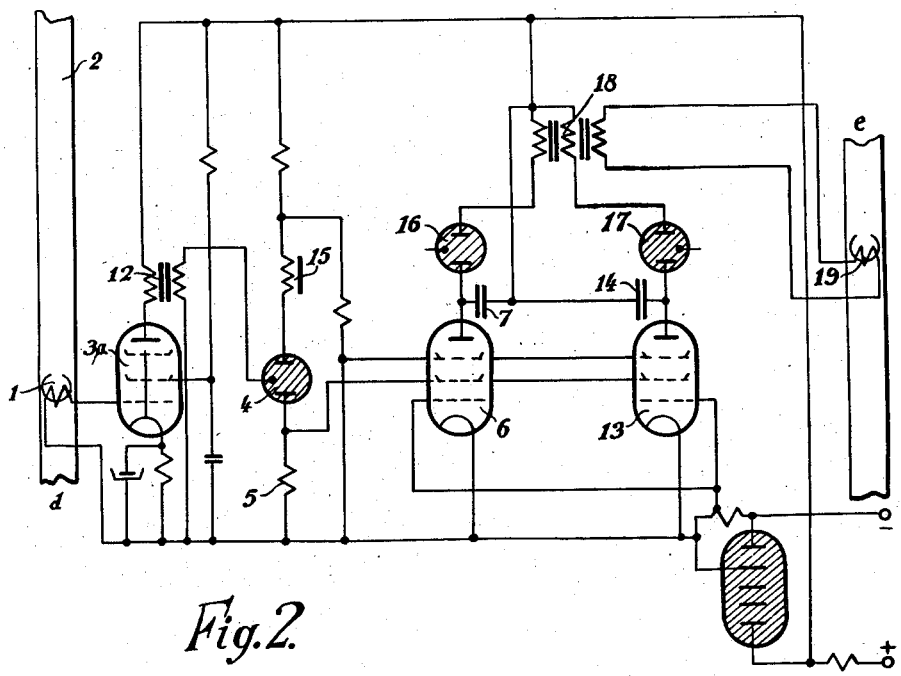
Fig. 2 shows a switching diagram of a computing arrangement making use of such electronically controlled computing means.

A more detailed circuit of the computing arrangement is shown in Fig. 2. The digit value representing signals are sensed from signal $d$ of tape 2 by means of the sensing head 1 and the resulting electrical impulses are fed to the grid of pentode 3a which forms the amplifier 3. The amplified voltage impulse is fed via the transformer 12 to the ignition electrode of gas discharge tube 4. The voltage drop across the resistor 5 in the main discharge circuit of tube 4 provides the screen grid potential of the pentodes 6 and 13. By the ignition of the gas discharge tube 4 both the pentodes are rendered conductive, and they charge the co-ordinated condensers 7 and 14 with a substantially constant current.

The charging is terminated when an extinguishing impulse, induced in coil 15 at a defined time, effects the extinction of tube 4. The extinguishing impulse is generated by a further sensing head which senses a signal recorded in another track, the signal induced in the sensing head being amplified and fed to the primary of a transformer, of which coil 15 is the secondary. The extinguishing impulse occurs at the end of each digit cycle. The function of the extinguishing impulse is described in more detail hereinafter in relation to the detailed circuit of Fig. 5. By a charging process of the same kind the second digit of the sum is introduced into the computing device and effects therewith a corresponding further charging of the condensers 7 and 14.

In the computing arrangement shown in Fig. 2, further charging by 10 charge units is provided. The gas discharge tube 16 ignites on receipt of 10 charge units and the other 17 on receipt of 20 charge units. The value of 20 charge units is chosen to enable reading out of the digit value from the computing arrangement in the manner described in detail hereinafter.

The striking voltage of these gas discharges as determined by the bias applied to the control electrodes is so chosen that the gas discharge tube 16 ignites when ten charging units are applied to the condenser 7. The discharge tube 17, however, has a higher striking voltage and ignites after the supply of 20 charging units. Through transformer 18 the recording of the result signal is effected by means of the recording head 19 when at the further charging of both the condensers after the introduction of the second term of the sum, one of the discharge tubes ignites.

The carry-over pre-mark signal is forwarded in dependence on the ignition of the discharge tube 17 which has the higher striking voltage, and simultaneously effects the effective subtraction of the ten represented by the carry-over.

In a modified form, the ignition of the gas discharge tube 16 before the termination of the receipt of the charge corresponding to a second digit value to be operated, can serve as a signal for the necessary forwarding of a digit value carry-over. The grid of charge tube 16 has such a striking voltage that there is an ignition whenever the potential of the condenser corresponds to the quantity of 10 charging units for each digit value.

Means for the transfer of the digit value carry-over from the preceding denomination is not represented in Fig. 2. The carry-over pre-mark signal is suitably recorded in an area of the record means which is coordinated to the next denomination area of the computing signal carrier. On ascertaining the digit value sum of the next denomination, this carry-over is taken care of for instance by increasing the charge of both the condensers 7 and 14 of Fig. 2 by one digit value, or this is done by decreasing the striking voltage of the discharge tubes 16 and 17 or of corresponding tubes, or by providing other means which effect the recording of the resulting digit value increased by the digit value carry-over.

For the performance of the subtraction either the complementary digit value is introduced by making a corresponding contact or the like, or the digit value as well as its value complementary to "9" are recorded at the same time on separate areas on the computing signal carrier, so that in addition—the direct digit value, and in subtraction—the complementary digit value, is taken from the computing signal carrier.

Figures 3, 4:
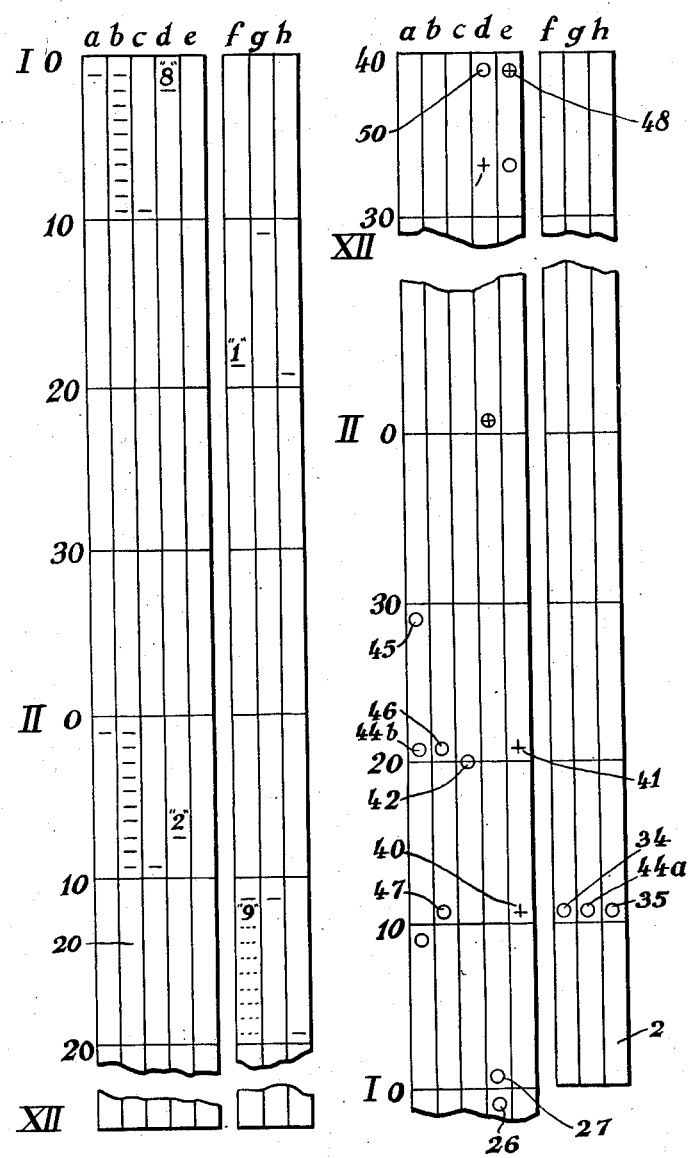
Fig. 3 shows a signal carrier with computing and synchronizing signals.
Fig. 4 shows a signal head arrangement with sets of signal heads.
Figure 5:
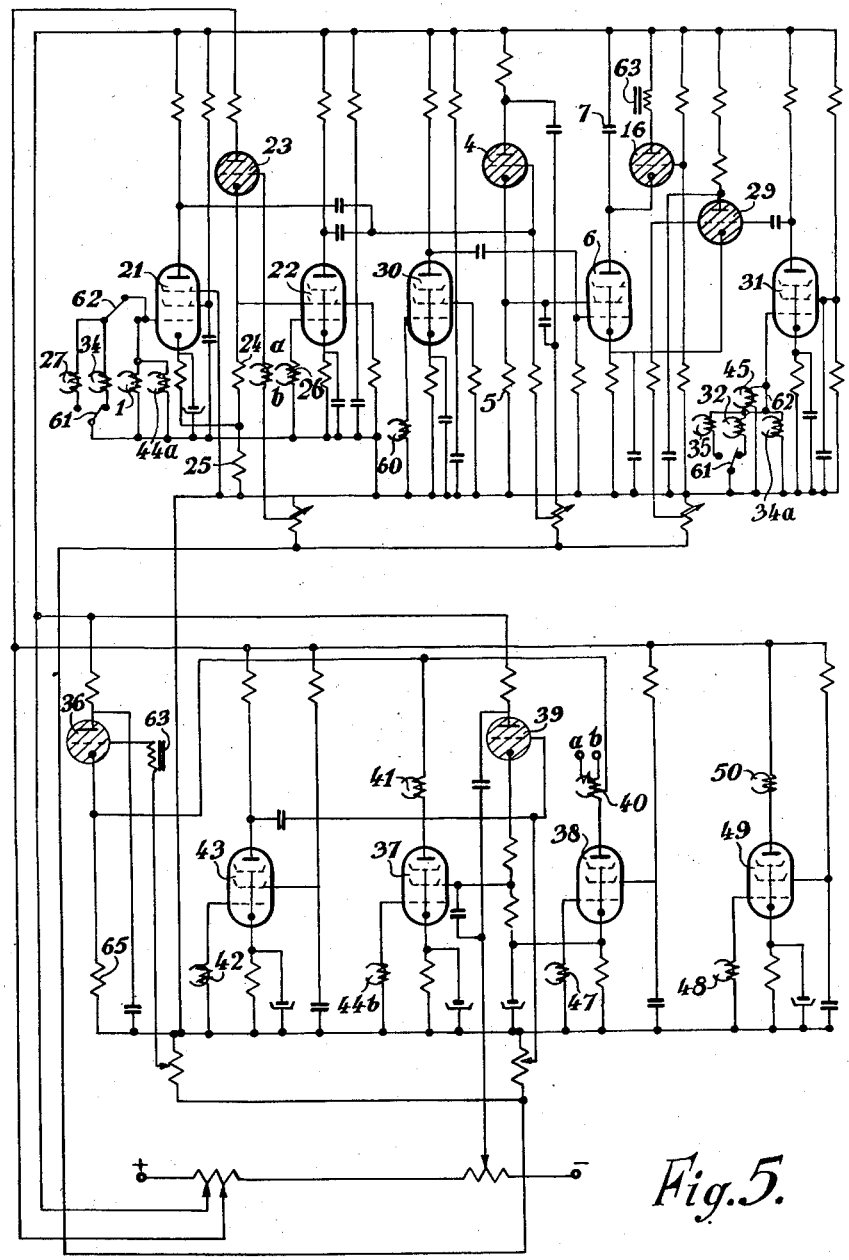
Fig. 5 shows a more detailed switching diagram of such a computing arrangement.

Figs. 3, 4 and 5 show electronic computing arrangement using a magnetizable disc as a storage means which storage disc is generally similar to that described in my co-pending application Serial No. 432,093, filed May 25, 1950 (now abandoned).

The arrangement of sensing, recording and erasing heads is shown in Fig. 4. The signal heads for tracks a–e are situated adjacent the surface of the disc 20. The signal heads of tracks a–c are used to sense permanently recorded signal pulses whereas the digit-value pulses are sensed and recorded in the tracks d and e of the disc. The signal heads associated with tracks f, g, h are for sensing and recording of signals on the tape 2. Track f contains the digit value signals, whereas in tracks g and h zero and terminating pulses are recorded.

Each track of the disc and the tape is divided into sectors I, II, etc., each of which corresponds to one denomination. Each of the sectors is divided into three parts. The start of the first part of each sector of the disc is indicated by a signal recorded in track A, and the end of each such first part is indicated by a signal recorded in track C. Ten signals, corresponding to the ten possible digit values, are recorded in track 6. The digit value signal is recorded in track D. Track is used for temporary recording during computation in a manner referred to hereinafter. The tracks f, g and h correspond in function to the tracks d, a and c, respectively, of the disc, but the signals are provided in the second part of each sector. The division of the sector into three parts corresponds to the three steps of sensing one digit to be entered, sensing the second digit to be entered, and recording a result value.

In the example illustrated, the digit value signals on the tape and on the disc 20 are recorded at a distance corresponding to the digit value from the limit value terminating signal the distance to the start-signal has a complementary meaning. Referring to Fig. 3 the sector I, track f, of the tape 2, the signal "one" is marked as an example, whereas the signal "nine" of the second denomination is marked in sector II, track f.

In a modified arrangement, instead of one "single pulse marking" of a digit value at a corresponding distance from the terminating or zero signal, such a number of pulses can be stored, which equals the digit value in question, so that the whole distance from the digit value-pulse to the terminating pulse is occupied by these digit pulses. In the following description three operating cycles will be considered namely:

First cycle: Sensing and entry of the digit-value of the first term of the sum from the storage disc, taking account of any ten's carry over from the previous denomination;

Second cycle: Sensing and adding of the second digit value from the tape, and determining whether a ten's carry over has to be effected;

Third cycle: Recording of the resulting digit-value.

In the detailed circuit shown in Fig. 5, the ignition of gas discharge tube 4 is effected either by the amplifying pentode 21 or the pentode 22. Both pentodes 21 and 22 are controlled by the gas discharge tube 23, in the cathode circuit of which two resistances 24 and 25 are connected. When the gas tube 23 is non-conducting the pentode 22 has substantially zero screen volts and is non-conducting, whereas the pentode 21 is conductive. When the gas tube 23 is conducting, the voltage drop across the resistors 24 and 25 provides sufficient screen volts to allow the pentode 22 to conduct, whereas the cathode of the pentode 21 is made sufficiently positive by the voltage drop across the resistor 25 to cut off the pentode 21.

The ignition of the gas discharge tube 23 is effected if a ten's carry-over has to take place. In this case the sensing head 26 senses the digit value signal and ignites the gas discharge tube 4 at that instant, when the digit value signal of track d passes the slot of the sensing head. The pentode 22 is "conductive" and amplifies the negative signal to ignite the discharge tube 4, as it has received its screen grid voltage from the resistances 24 and 25 in the discharge circuit of the discharge tube 23. If the gas tube 23 were non-conducting, the pentode 22 would be non-conductive and the sensing of the digit value signal by the head 26 would be ineffective. However, the same signal is sensed by the head 27, Fig. 4, which is offset relatively to the head 26 to provide a delay of one digit time. The signal from the head 27 is applied to the control grid of the pentode 21, which will therefore ignite the gas tube 4 one digit time later than if it had been ignited by the signal from the pentode 22.

The ignition of the gas discharge tube 4 renders conductive the pentode 6, as the voltage drop caused by the cathode resistance 5 of the said discharge tube produces the necessary screen grid voltage for the pentode 6. From this instant the charging of the capacitor 7 commences.

The charging can be effected either in a continuous manner, beginning at the digit value pulse and terminated by a limiting value pulse, or by a definite number of intermittent charging pulses, controlled by rectangular pulses in a number corresponding to the digit value, e.g. one rectangular impulse for digit value "1," nine rectangular pulses for digit value "9" and so on. In the example shown in Fig. 5 the latter way is also shown.

With a continuous charging of the capacitor, it begins at the ignition of discharge tube 4 and terminates at the ignition of discharge tube 29. In this case the control grid of pentode 6 can be connected directly to the zero potential line, and pentode 30 can be omitted. If during the interval between the ignition of discharge tube 4 and the ignition of discharge tube 29 a certain number of digit pulses are to be added, the tube 30 is used, the plate-screen grid voltage—and control grid-bias of the pentode 30 are chosen in such a way, that the pulses induced in head 60 produce substantially rectangular pulses at the anode of the pentode, so that the charging of capacitor 7 is effected only during the time these rectangular pulses are applied to the control grid of pentode 6.

The rendering non-conductive of pentode 6 is effected by means of the gas discharge tube 29, the ignition of which makes the cathode of pentode 6 positive in relation to the suppressor grid. The control grid of the discharge tube 29 is connected capacitatively to the anode of the amplifier pentode 31. The control grid of the latter is connected to the winding of the head 32.

In short the first cycle of the adding procedure is the following one: Sensing head 27 and sensing head 26 have a signal induced in the windings by a recorded digit value signal. In dependence, whether the discharge tube 23 is conductive or not, either pentode 21 or 22 will be conductive and will ignite the gas tube 4 to allow the pentode 6 to charge to capacitor 7.

Thus the charging of the capacitor 7 begins at the time when the digit value pulse recorded on track d of the disc passes under the slot of either sensing head 27 or 26.

The pentode 6 is "cut off" and the charging of the capacitor 7 terminated, when the discharge tube 29 is ignited by the amplified terminating pulse resulting from the signal induced within sensing head 32.

Second cycle: Sensing and addition of the new digit value from the tape, and determining whether a ten's carry-over has to be effected.

The second cycle of the addition procedure is effected by the same circuit as described for the first cycle. However, different sensing heads have to be used by operation of switches 61 and 62, namely the sensing heads 34 and 35 for addition and winding 34a of the head 34 and head 44a for subtraction. With switch 62 in the position shown addition is effected in the second cycle. The procedure is effected in such a way, that the digit value-signals of track f of the tape ignite the discharge tube 4 via amplifying pentode 21, operating the charging pentode 6, whereas the terminating pulse is closing the said loading pentode via sensing head 35 amplifying pentode 31 and discharge tube 29 due to the sensing of a limiting value terminating signal on track h of the tape.

In the other position of switch 62, the signal resulting in ignition of the tube 4 is induced in sensing head 44 in the signal in the zero position of track g of the tape, whereas the rendering non-conductive of the pentode 6 is effected by the digit value-pulse, induced in a further winding 34a of sensing head 34. By this means a complementary addition instead of ordinary addition takes place.

On capacitor 7 the sum of the digit values of the denomination to be operated, if necessary plus one from the ten's carry-over, has been produced as a resulting voltage in the first two cycles.

By means of a bias on its control grid the gas discharge tube 16 is controlled in such a manner, that at a voltage across the capacitor 7 greater than that produced by a digit entry of "9" the gas triode is ignited, so that at the instant, the voltage of the condenser is passing from nine to ten a sharp pulse is produced in the discharge circuit 16 thus discharging the capacitor 7. By this pulse the discharge tube 36 is ignited via transformer 63 producing as voltage drop across its cathode resistance 65 the plate voltage for the pentodes 37 and 38. During the second cycle the pentode 38 is conductive, as discharge tube 39 has not yet been ignited. If, e.g. two digit values 8+5=13 had to be added in the first two cycles, the voltage, across the capacitor will have exceeded the limiting value, when there were still three pulses left for sensing in track b, as the other permanently recorded pulses in this track had already passed.

Therefore, from the instant of the "rendering conductive" of pentode 39 three impulses of track b will still be effectively sensed by the sensing head 47 and recorded by means of the recording head 40. In this case, the recording head has a secondary winding with the endings a, b connected to ignite the discharge tube 23, indicating and effecting, that a ten's carry over will take place into the next denomination, as pentode 22 will be operative at the computing-process of the next denomination, instead of pentode 21.

If in this second cycle the voltage of capacitor 7 does not reach the ignition voltage of the tube 16, i.e. that the resulting digit value during the first two cycles is lower than ten, the pentode 38 will not be effective for this denomination and no ten's carry indicating pulse is produced by the secondary winding a, b of recording head 40. In track c between field 20 and 21 the sensing head 42 is arranged, by which the zero pulse in track c is sensed. After amplification in pentode 43, the sensed signals ignite the discharge tube 39 at the passing-over from the second to the third cycle, so that during the third cycle pentode 38 is non-conductive, whereas pentode 37 will be conductive.

Third cycle: Recording of the resulting digit value: If the resulting digit value was equal to or higher than ten, the recording of the resulting digit value has already been effected during the second cycle.

In the third cycle, only those resulting voltages of capacitor 7 are effective, which are lower than that corresponding to ten. In this case the third cycle with a constant adding of ten further digit value unities takes place automatically by ignition of the gas tube 4 by a signal from sensing head 46 and the ignition of the gas tube 6 by the signal from sensing head 45. The ten further digit signals are sensed by head 46 from track b of the disc.

By this means within this third cycle the respective voltages of all those resulting digit values being lower than ten in the first two cycles, will exceed the limiting voltage set by the bias of the control grid of gas discharge tube 16. In the same way, as described above, the remaining digit value pulses corresponding to the resulting digit values, are recorded in track e as a result of sensing head 46 applying pulses to the pentode 37 which effects the energization of recording head 41, as during the third cycle the gas discharge tube 39 is conducting, opening pentode 37 and closing pentode 38.

If, e.g. 1+2=3 would have to be added, the result within the first two cycles "3" would be lower than ten. In the third cycle the limiting voltage would be exceeded at an instant, when there were still three pulses left, as was the case in the example of the second cycle 8+5=13, only with the difference, that this transfer was effected from sensing head 46 via pentode 32 to recording head 41, i.e. in the third cycle without any effect as to ten's carry-over.

In a modified arrangement instead of the recording of all remaining signals of track b from the instant when the limiting voltage is exceeded, only the first signal can be marked on track e. This effect can either be gained by means of a short discharging period of discharge circuit or by recording the pulse itself by means of a capacity discharge over a discharge tube being ignited in that instant, when the first pulse over sensing coil is coming through.

Pentode 49 effects the retransfer of signals from track e to track d via sensing head 46 to recording head 50.

The erasing heads in tracks d and e can be switched on or off. They are preferably operating with the high frequency method of erasing as known from normal tape-recorders.

It will be appreciated that the tape 2 is moved past the associated magnetic heads in synchronism with the rotation of the disc 20 past the magnetic heads associated with the said disc.

While I have described a preferred embodiment of my invention, it is to be understood that the latter is capable of numerous modifications without departing from the spirit of the invention.

What I claim is:

1. In combination, a track carrier means; a plurality of magnetic signal recording tracks on said carrier means, each track being divided into sectors of different denominational significance; signal transducing means cooperating with each of said tracks to scan said sectors of the respective track in succession, corresponding sectors of different tracks being scanned at the same time; a counter means operative to form the sum of digit representing signals applied to the input thereof; means to apply to the input of said counter means digit representing signals sensed by the transducing means associated with a first and with a second of said tracks, respectively, the digit representing signals from a sector of said second track being applied to said counter after the digit representing signals from the corresponding sector of said first track and before the digit representing signals from the next sector to be sensed; means to derive a train of timing signals from a further one of said tracks for each sector; means operative to read out sum digit representing signals from said counter under control of the timing signals for each sector before the digit representing signals for the next sector are applid to the input of said counter; and means to apply the sum digit representing signals to one of said transducing means to record the sum digit values in one of said tracks.

2. A combination as claimed in claim 1, in which said counter includes a storage capacitor; means operative to charge said capacitor at a predetermined rate; means operative to generate a further train of timing signals from one of said tracks; and means responsive to the signals from said first and second tracks and to said further timing signals to control the time for which said charging means is to be operative.

3. A combination as claimed in claim 1, in which said counter includes a storage capacitor; means operative to charge said capacitor at a predetermined rate; means operative to generate a second and a third train of timing signals; means to select one of said second and third trains of timing signals; and means responsive to the signals from the first and second tracks and the selected one of said second and third timing pulse trains to control the duration of operation of said charging means.

4. A calculating arrangement including a magnetic signal storage device providing a plurality of separate storage tracks; transducing means for a first and a second of said tracks, each transducing means being operative to derive electrical signals representing in succession the digits of a multi-denominational number; means to generate a first and a second succession of timing signals in synchronism with the operation of said transducing means; a counter responsive to input signals and to the first succession of timing signals to register the sum of input signals applied thereto; means to apply the signals from the first and second transducing means as input signals to said counter, the signals representing a digit from the second track being preceded and followed by signals representing digits from the first track; means controlled by said second succession of timing signals and operative after the application of signals representing a digit from each of said first and second tracks, to read out signals representing the sum registered by said counter; and transducing means operated by the read out signals to record the sum digit value in one of said tracks.

5. An arrangement as claimed in claim 1, in which said transducing means for the first track includes a pair of magnetic sensing heads; and in which said counter includes a carry storage device settable to carry and no-carry conditions and means responsive to the condition of the carry storage to render effective one of said heads for a carry condition and the other of said heads for a no-carry condition.

References Cited in the file of this patent
UNITED STATES PATENTS

| | | |
|---|---|---|
| 2,510,485 | Vossberg | June 6, 1950 |
| 2,564,403 | May | Aug. 14, 1951 |
| 2,701,095 | Stibitz | Feb. 1, 1955 |
| 2,737,342 | Nelson | Mar. 6, 1956 |
| 2,767,908 | Thomas | Oct. 23, 1956 |

FOREIGN PATENTS

| | | |
|---|---|---|
| 731,140 | Great Britain | June 1, 1955 |

OTHER REFERENCES

"The Logistics Computer," Erickson, Proceedings of the IRE, October 1953.